US012561296B2

(12) United States Patent
Nouard et al.

(10) Patent No.: US 12,561,296 B2
(45) Date of Patent: Feb. 24, 2026

(54) INTUITIVE DATA FLOW (IDF)

(71) Applicant: SAP SE, Walldorf (DE)

(72) Inventors: Arnaud Nouard, Vaux-sur-Mer (FR);
Raphael Geoffroy, Colombes (FR);
Jerome Cailly, Bessancourt (FR)

(73) Assignee: SAP SE, Walldorf (DE)

( * ) Notice: Subject to any disclaimer, the term of this patent is extended or adjusted under 35 U.S.C. 154(b) by 14 days.

(21) Appl. No.: 18/368,289

(22) Filed: Sep. 14, 2023

(65) Prior Publication Data

US 2025/0094393 A1     Mar. 20, 2025

(51) Int. Cl.
| | |
|---|---|
| *G06F 16/215* | (2019.01) |
| *G06F 16/2455* | (2019.01) |
| *G06F 16/25* | (2019.01) |
| *G06F 16/26* | (2019.01) |

(52) U.S. Cl.
CPC ........ *G06F 16/215* (2019.01); *G06F 16/2455* (2019.01); *G06F 16/254* (2019.01); *G06F 16/26* (2019.01)

(58) Field of Classification Search
CPC .... G06F 16/215; G06F 16/26; G06F 16/2455; G06F 16/254
USPC ........................................................ 707/602
See application file for complete search history.

(56) References Cited

U.S. PATENT DOCUMENTS

| | | | | | |
|---|---|---|---|---|---|
| 7,072,843 | B2 * | 7/2006 | Menninger | ............ | G06Q 20/20 705/16 |
| 7,171,379 | B2 * | 1/2007 | Menninger | ............ | G06Q 10/06 705/28 |

| | | | | | |
|---|---|---|---|---|---|
| 7,680,855 | B2 * | 3/2010 | Hyder | .................... | G06Q 10/10 707/811 |
| 7,702,639 | B2 * | 4/2010 | Stanley | .................. | G06F 16/20 707/999.1 |
| 7,890,519 | B2 * | 2/2011 | Dettinger | ............ | G06F 16/2458 707/754 |
| 8,145,652 | B2 * | 3/2012 | Bent | .................. | G06F 16/2471 707/758 |
| 8,321,373 | B2 * | 11/2012 | Bakalash | .............. | G06F 16/283 707/600 |
| 8,676,802 | B2 * | 3/2014 | Zelevinsky | ........... | G06F 16/338 707/705 |
| 8,812,411 | B2 * | 8/2014 | Malka | .................. | G06Q 10/067 706/12 |
| 9,477,691 | B1 * | 10/2016 | Reiner | ................ | G06F 16/2282 |
| 9,514,230 | B2 * | 12/2016 | Raina | ................ | G06F 16/24539 |
| 9,519,712 | B2 * | 12/2016 | Goodall | ................ | G06F 16/951 |
| 9,600,358 | B1 * | 3/2017 | Reiner | ................ | G06F 11/079 |
| 9,652,790 | B2 * | 5/2017 | Anand | .............. | G06Q 30/0601 |

(Continued)

*Primary Examiner* — Hanh B Thai
(74) *Attorney, Agent, or Firm* — Sterne, Kessler, Goldstein & Fox P.L.L.C.

(57) ABSTRACT

Embodiments are described for a database management system comprising a memory and at least one processor coupled to the memory. The at least one processor is configured to receive a request to display a first data management process and identify a data query quality and a data transform quality for display. The first data management process comprises a first data source, a first data query, and a first data transform. The at least one processor is further configured to determine a first value of the data query quality for the first data query and a second value of the data transform quality for the first data transform and display the first data management process based on the first value and the second value.

20 Claims, 7 Drawing Sheets

(56) References Cited

U.S. PATENT DOCUMENTS

| | | | | |
|---|---|---|---|---|
| 10,120,897 B2 * | 11/2018 | Antani | G06F 16/24532 |
| 10,120,916 B2 * | 11/2018 | Faruquie | G06F 16/215 |
| 10,459,881 B2 * | 10/2019 | Barth | G06F 16/182 |
| 10,599,678 B2 * | 3/2020 | Kapoor | G06F 16/211 |
| 10,621,164 B1 * | 4/2020 | Kain | G06F 16/215 |
| 10,645,548 B2 * | 5/2020 | Reynolds | G06F 16/252 |
| 10,649,995 B2 * | 5/2020 | Weissman | G06F 16/24 |
| 10,678,771 B1 * | 6/2020 | Kenthapadi | G06F 16/958 |
| 10,733,177 B1 * | 8/2020 | Kenthapadi | H04L 63/10 |
| 11,194,772 B2 * | 12/2021 | Bartlett | G06F 16/211 |
| 11,243,919 B2 * | 2/2022 | Bartlett | G06F 16/254 |
| 11,461,367 B2 * | 10/2022 | You | G06F 16/283 |
| 11,488,697 B1 * | 11/2022 | Falcone | G16H 40/20 |
| 11,645,299 B2 * | 5/2023 | Takagi | G06F 16/25 |
| | | | 707/756 |
| 12,093,254 B1 * | 9/2024 | Kondiles | G06F 16/2379 |
| 2003/0156299 A1 * | 8/2003 | Martinez | H04N 1/6052 |
| | | | 358/1.9 |
| 2006/0015416 A1 * | 1/2006 | Hoffman | G06Q 10/06 |
| | | | 705/28 |
| 2007/0100783 A1 * | 5/2007 | Cialini | G06F 16/217 |
| 2008/0317431 A1 * | 12/2008 | Mishima | H04N 5/85 |
| | | | 375/E7.076 |
| 2012/0054185 A1 * | 3/2012 | Johnson | G06F 16/35 |
| | | | 707/739 |
| 2012/0215766 A1 * | 8/2012 | Gorelik | G06F 16/248 |
| | | | 707/E17.014 |
| 2013/0332195 A1 * | 12/2013 | Galuten | G16H 50/70 |
| | | | 705/3 |
| 2014/0006411 A1 * | 1/2014 | Boldyrev | G06F 16/2455 |
| | | | 707/741 |
| 2014/0067760 A1 * | 3/2014 | Rajendran | G06F 16/2372 |
| | | | 707/624 |
| 2014/0081950 A1 * | 3/2014 | Rajan | G06F 16/24549 |
| | | | 707/715 |
| 2015/0066986 A1 * | 3/2015 | Piecko | G06F 16/24553 |
| | | | 707/779 |
| 2015/0088806 A1 * | 3/2015 | Lotan | G06F 16/256 |
| | | | 707/602 |
| 2016/0267082 A1 * | 9/2016 | Wong | G06F 16/164 |
| 2016/0328427 A1 * | 11/2016 | Gruener | G06F 16/24549 |
| 2016/0364434 A1 * | 12/2016 | Spitz | G06F 16/248 |
| 2017/0039245 A1 * | 2/2017 | Wholey, III | G06F 16/2428 |
| 2017/0098318 A1 * | 4/2017 | Iannaccone | G06F 3/04855 |
| 2017/0103101 A1 * | 4/2017 | Mason | G06F 16/2365 |
| 2017/0103103 A1 * | 4/2017 | Nixon | G06F 16/2452 |
| 2017/0140278 A1 * | 5/2017 | Gupta | G06N 20/00 |
| 2017/0329816 A1 * | 11/2017 | Shah | G06F 16/2365 |
| 2017/0364554 A1 * | 12/2017 | Nica | G06F 16/24534 |
| 2018/0096027 A1 * | 4/2018 | Romero | G06F 16/9535 |
| 2018/0210936 A1 * | 7/2018 | Reynolds | G06F 21/6227 |
| 2019/0095516 A1 * | 3/2019 | Srinivasan | H04L 63/102 |
| 2019/0130002 A1 * | 5/2019 | Mathur | G06F 16/2272 |
| 2019/0243833 A1 * | 8/2019 | Aldrich | G06F 16/24542 |
| 2019/0334791 A1 * | 10/2019 | Hopkins | H04L 43/028 |
| 2019/0370233 A1 * | 12/2019 | Yamashita | G06F 16/254 |
| 2020/0004749 A1 * | 1/2020 | Slezak | G06N 5/01 |
| 2020/0134136 A1 * | 4/2020 | Dunaway | G16B 50/00 |
| 2021/0019312 A1 * | 1/2021 | Shaik | G06F 16/24522 |
| 2021/0064620 A1 * | 3/2021 | Namaki | G06F 16/90324 |
| 2021/0319043 A1 * | 10/2021 | You | G06F 16/2465 |
| 2021/0390101 A1 * | 12/2021 | Shaik | G06F 16/2282 |
| 2022/0019597 A1 * | 1/2022 | Takagi | G06F 16/25 |
| 2022/0253744 A1 * | 8/2022 | Sloane | G06F 18/24 |
| 2022/0382779 A1 * | 12/2022 | Ogievetsky | G06F 16/287 |
| 2023/0031659 A1 * | 2/2023 | Daimler | G06F 16/289 |
| 2023/0122851 A1 * | 4/2023 | Urness | G16H 40/67 |
| | | | 707/692 |
| 2023/0185828 A1 * | 6/2023 | Kumar | G06F 16/285 |
| | | | 707/739 |
| 2023/0334122 A1 * | 10/2023 | Gong | G06F 16/258 |
| 2024/0020759 A1 * | 1/2024 | Richards | G06Q 40/025 |
| 2024/0062119 A1 * | 2/2024 | Bisht | G06N 20/20 |
| 2024/0345551 A1 * | 10/2024 | Ramanasankaran | G06N 3/0895 |
| 2025/0045276 A1 * | 2/2025 | Srinivasan | G06F 16/2471 |
| 2025/0077530 A1 * | 3/2025 | Motgi | G16H 10/60 |
| 2025/0307240 A1 * | 10/2025 | Denning | G06F 16/285 |

* cited by examiner

700

INTUITIVE DATA FLOW (IDF)

BACKGROUND

A database management system may receive a request to retrieve, process, and display data. The request may require multiple steps, which can be difficult or at least not intuitive for a user to understand and control. Thus, an intuitive data flow (IDF) design is needed to enable the user to better utilize the database management system.

SUMMARY

Some embodiments of this disclosure relate to apparatus, system, computer program product, and method embodiments for implementing a database management system with an IDF.

Some embodiments of this disclosure provide a database management system comprising a memory and at least one processor coupled to the memory. The at least one processor is configured to receive a request to display a first data management process and identify a data query quality and a data transform quality for display. The first data management process comprises a first data source, a first data query, and a first data transform. The at least one processor is further configured to determine a first value of the data query quality for the first data query and a second value of the data transform quality for the first data transform and display the data management process based on the first value and the second value. The first data query corresponds to a first portion of the first data management process and the first data transform corresponds to a second portion of the first data management process. Furthermore, a width of the first portion of the first data management process is associated with the first value and a width of the second portion of the first data management process is associated with the second value.

Some embodiments of this disclosure provide a computer-implemented method for a database management system. The method comprises receiving a request to display a first data management process and identifying a data query quality and a data transform quality for display. The first data management process comprises a first data source, a first data query, and a first data transform. The method further comprising determining a first value of the data query quality for the first data query and a second value of the data transform quality for the first data transform and displaying the data management process based on the first value and the second value. The first data query corresponds to a first portion of the first data management process and the first data transform corresponds to a second portion of the first data management process. Furthermore, a width of the first portion of the first data management process is associated with the first value and a width of the second portion of the first data management process is associated with the second value.

Some embodiments of this disclosure provide a non-transitory computer-readable medium (CRM) comprising instructions to, when executed by at least one computing device, causes the at least one computing device to perform operations. The operations comprise receiving a request to display a first data management process and identifying a data query quality and a data transform quality for display. The first data management process comprises a first data source, a first data query, and a first data transform. The operations further comprise determining a first value of the data query quality for the first data query and a second value of the data transform quality for the first data transform and displaying the data management process based on the first value and the second value. The first data query corresponds to a first portion of the first data management process and the first data transform corresponds to a second portion of the first data management process. Furthermore, a width of the first portion of the first data management process is associated with the first value and a width of the second portion of the first data management process is associated with the second value.

This Summary is provided merely for the purposes of illustrating some embodiments to provide an understanding of the subject matter described herein. Accordingly, the above-described features are merely examples and should not be construed to narrow the scope or spirit of the subject matter in this disclosure. Other features, embodiments, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
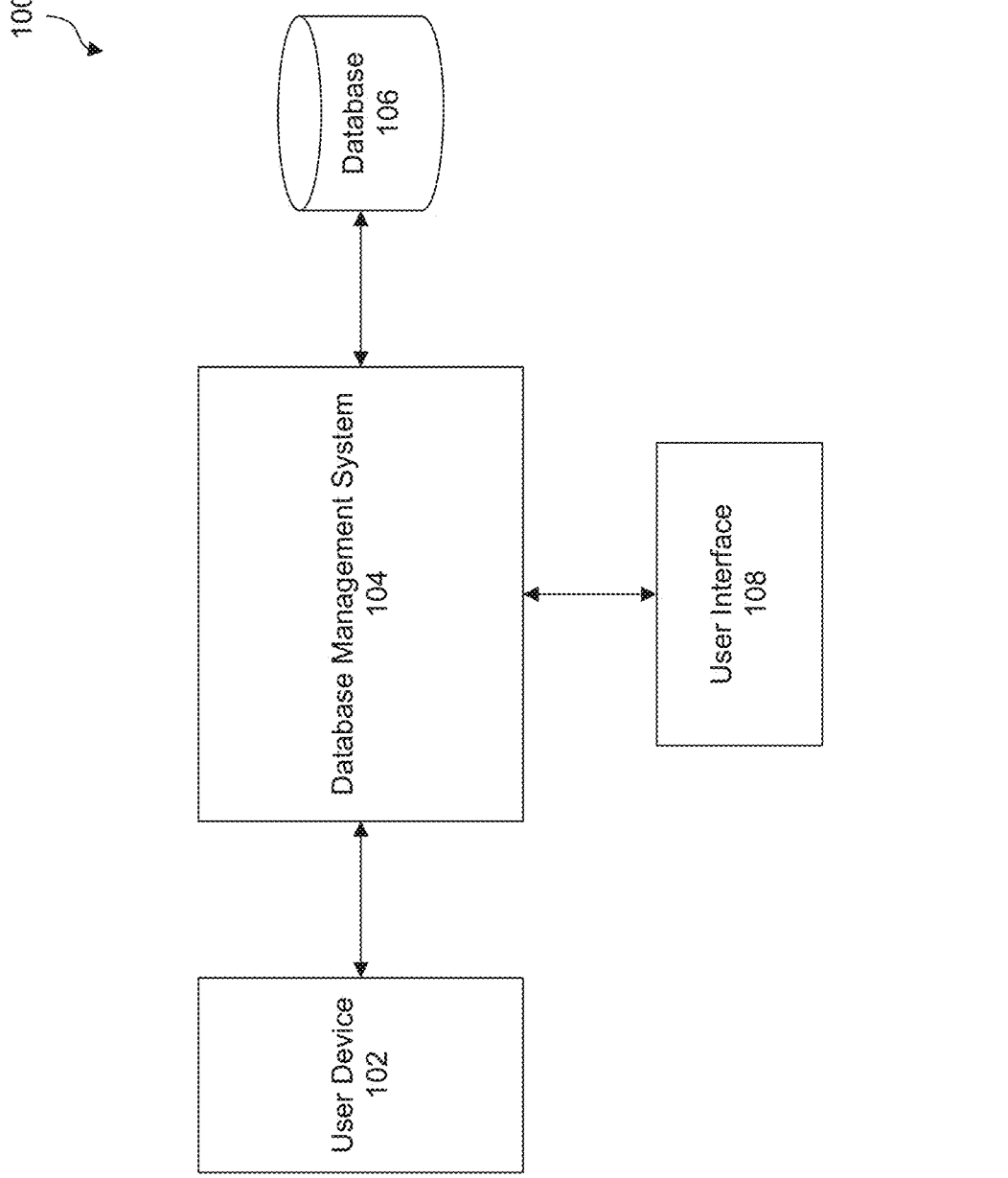
FIG. 1 illustrates an example system implementing retrieving, processing, and displaying data, according to some embodiments of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some embodiments of this disclosure include apparatus, system, computer program product, and method embodiments for implementing a database management system with an IDF.

In some embodiments, a data management process includes multiple steps. For example, the data management process may include selecting data sources, fetching data, blending or merging operations, filtering, consuming data for visualization, adjusting queries, and so on. Furthermore, some systems may require the data management process to include multiple steps of the same type. For example, the data management process may include multiple merging operations. Thus, the data management process can be complicated and difficult for a user to understand. Specifically, the user needs to understand every step to know where the data come from, what steps the data went through, and where the data were used. In some embodiments, the user can check the source code to determine each step that the data went through. For example, the user can check queries executed to determine the data sources selected. However, it can be time consuming and error-prone for the user to check the source code for such information.

In some embodiments, it is beneficial to show the steps in a data flow illustration, such as an IDF. For example, each step of the data management process can be a node or a section in the IDF. Steps that the data went through can be connected. In such a case, the user can identify data from each data source and the steps the data went through based on the data flow illustration.

In some embodiments, even with the data flow illustration, it is not clear what kind of data when through each step. For example, a data source may connect with a data query step. The user can determine that the data comes from the data source, but the user cannot determine an amount of data retrieved from the data source or a time duration used to retrieve the data. In some embodiments, the database management system illustrates metadata using lines connecting steps. For example, the database management system can define a weight or a width of a line between the data source and the data query step based on the amount of data retrieved from the data source by the data query step or based on the time duration used to execute a query in the query step. Specifically, when a large amount of data is retrieved by the query step from the data source, the database management system can display a thick line between the data source node and the query step node. Otherwise, the database management system can display a thin line between the data source node and the query step node. Similarly, when the data query takes a long time to execute, the database management system can display a thick line between the data source node and the query step node. Otherwise, the database management system can display a thin line between the data source node and the query step node. In such a case, the user can have access to more information regarding the data by observing the data flow illustration.

In some embodiments, the user may be enabled to modify data management processes via the data flow illustration. For example, the data flow illustration may display a first data management process that includes a first data source connecting with a first data query step. Thus, the user can determine that the first data query retrieves data from the first data source. The user can also disconnect the first data source and the first data query step and reconnect a second data source with the first data query step in the data flow illustration. In such a case, the user configures the first data query to retrieve data from the second data source instead of the first data source. For another example, the data flow may also include a second data management process that includes a second data query step connecting with a third data source. The user can select the first data query step and the second data query step to merge. In such a case, data in the first data management process and data in the second data management process are merged after their respective data query steps. For example, the database management system can create a unified dataset to include the data retrieved by the first data query and the data retrieved by the second data query.

In summary, the data flow illustration can assist the user to understand, control, and reconfigure data management processes.

FIG. 1 illustrates an example system implementing retrieving, processing, and displaying data, according to some embodiments of the disclosure. The example system 100 is provided for the purpose of illustration only and does not limit the disclosed embodiments. The example system 100 may include, but is not limited to, a user device 102, a database management system 104, a database 106, and a user interface 108. The user device 102 may include, but is not limited to, wireless communication devices, smartphones, laptops, desktops, tablets, personal assistants, monitors, televisions, wearable devices, Internet of Things (IoT) devices, vehicle communication devices, and the like. The database management system 104 may include, but is not limited to, computer systems, servers, cloud systems, cloud servers, laptops, desktops, personal computers, and the like. The database 106 can be a local storage device or a remote storage system operating through the cloud. The user interference 108 can be a display device or an independent console that can be accessed by a user. In some embodiments, the user interface 108 can be integrated into the database management system 104. In other embodiments, the user interface 108 can also be integrated into the user device 102.

In some embodiments, user device 102 may transmit a request for data to the database management system 104. The request may indicate one or more data sources in the database 106. The database management system 104 can generate one or more queries based on the request and retrieve data from the one or more data sources in the database 106. Furthermore, the database management system 104 can process the data. For example, the data may include a first data set retrieved based on a first query from a first data source of the one or more data sources in the database 106. The data may also include a second data set retrieved based on a second query from a second data source of the one or more data sources in the database 106. The database management system 104 may determine that the first query and the second query include a common object. In such a case, the database management system 104 can merge the first data set and the second data set into a combined data set. For another example, the database management system 104 may include one or more filters that remove a portion of data retrieved. For example, the database management system 104 can generate a filter that removes data that correspond to a specific time period. In some embodiments, the database management system 104 can export the processed data to the user device 102, the user interface 108, or other devices for the user to view.

In some embodiments, the database management system 104 can also generate a summary of the data that has been retrieved and processed. For example, the summary may indicate an amount of data retrieved, an amount of data exported, a time duration for retrieving data, and/or other information. The database management system 104 can transmit the summary to the user interference 108 to display for the user. In some embodiments, the user can adjust the request based on the summary. For example, if data retrieved from a particular data source were not exported, the user can configure to remove a query corresponding to the particular data source.

Figure 2:
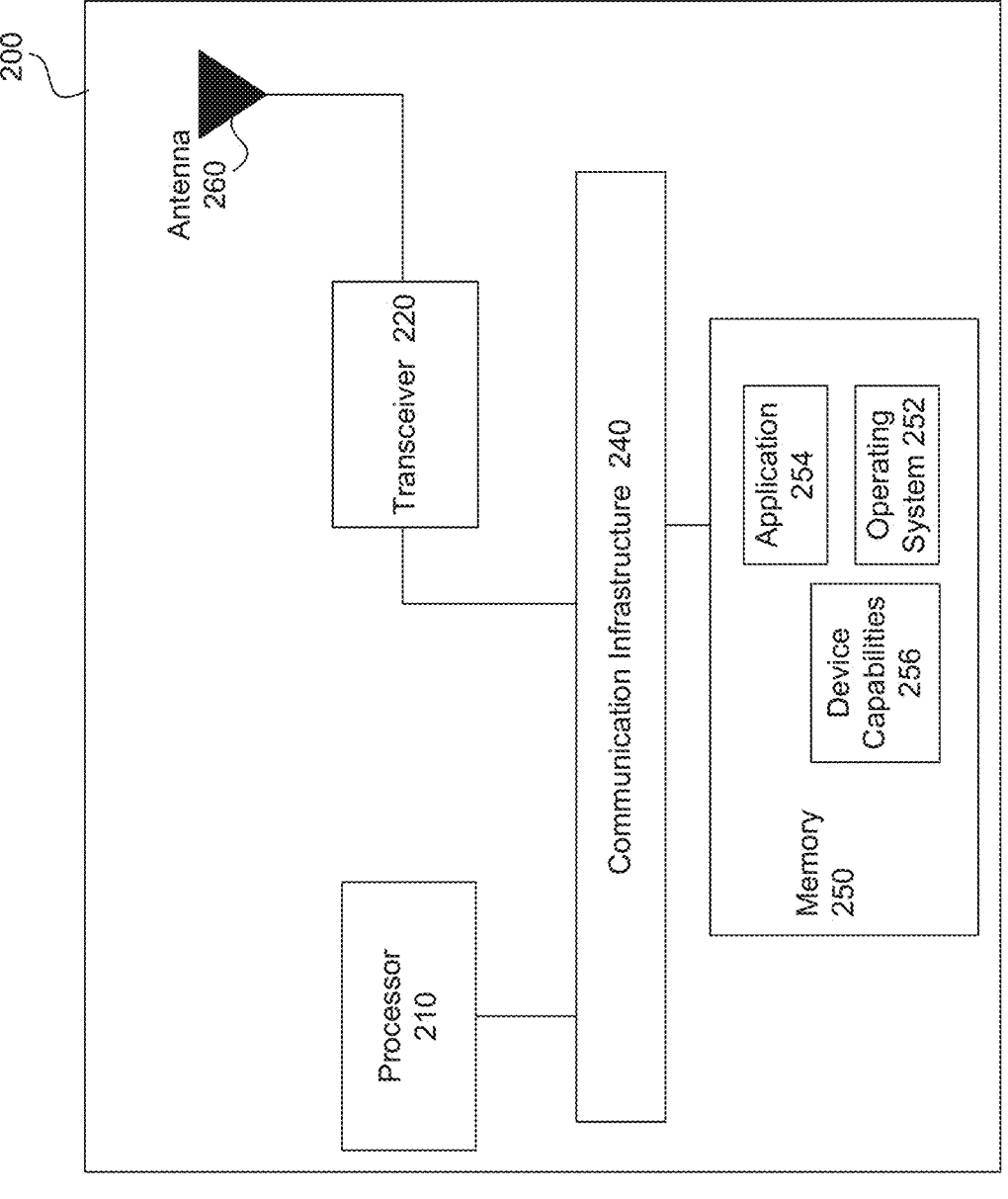
FIG. 2 illustrates a block diagram of an example system implementing retrieving, processing, and displaying data, according to some embodiments of the disclosure.

FIG. 2 illustrates a block diagram of an electronic device 200 implementing retrieving, processing, and displaying data, according to some embodiments of the disclosure. The electronic device 200 may be any of the electronic devices (e.g., the user device 102, the database management system 104, the database 106, the user interference 108, or a combination thereof of FIG. 1) of the system 100. The electronic device 200 includes a processor 210, one or more transceivers 220, a communication infrastructure 240, a memory 250, an operating system 252, an application 254, device capabilities 256, and antenna 260. Illustrated systems are provided as exemplary parts of electronic device 200, and electronic device 200 may include other circuit(s) and subsystem(s). Also, although the systems of electronic device 200 are illustrated as separate components, the embodiments of this disclosure may include any combination of these, e.g., less, or more components.

The memory 250 may include random access memory (RAM) and/or cache, and may include control logic (e.g., computer software) and/or data. The memory 250 may include other storage devices or memory. According to some examples, the operating system 252 may be stored in the memory 250. The operating system 252 may manage transfer of data from the memory 250 and/or the one or more applications 254 to the processor 210 and/or the one or more transceivers 220. In some examples, the operating system 252 maintains one or more network protocol stacks (e.g., Internet protocol stack, cellular protocol stack, and the like) that may include a number of logical layers. At corresponding layers of the protocol stack, the operating system 252 includes control mechanisms and data structures to perform the functions associated with that layer.

According to some examples, the application 254 may be stored in the memory 250. The application 254 may include applications (e.g., user applications) used by the electronic device 200 and/or a user of the electronic device 200. The application 254 may include functions such as, but not limited to, radio streaming, video streaming, remote control, and/or other user functions. In some embodiments, the device capabilities 256 may be stored in the memory 250.

The electronic device 200 may also include the communication infrastructure 240. The communication infrastructure 240 provides communication between, for example, the processor 210, the one or more transceivers 220, and the memory 250. In some implementations, the communication infrastructure 240 may be a bus.

The processor 210, alone, or together with instructions stored in the memory 250 performs operations enabling electronic device 200 of the system 100 to implement mechanisms for retrieving, processing, and displaying data, as described herein. Alternatively, or additionally, the processor 210 can be "hard coded" to implement mechanisms for retrieving, processing, and displaying data, as described herein.

The one or more transceivers 220 transmit and receive communications signals support mechanisms for retrieving, processing, and displaying data. Additionally, the one or more transceivers 220 transmit and receive communications signals that support mechanisms for measuring communication link(s), generating and transmitting system information, and receiving the system information. According to some embodiments, the one or more transceivers 220 may be coupled to the antenna 260 to wirelessly transmit and receive the communication signals. The antenna 260 may include one or more antennas that may be the same or different types and can form one or more antenna ports. The one or more transceivers 220 allow electronic device 200 to communicate with other devices that may be wired and/or wireless. In some examples, the one or more transceivers 220 may include processors, controllers, radios, sockets, plugs, buffers, and like circuits/devices used for connecting to and communication on networks. According to some examples, the one or more transceivers 220 include one or more circuits to connect to and communicate on wired and/or wireless networks.

According to some embodiments of this disclosure, the one or more transceivers 220 may include a cellular subsystem, a WLAN subsystem, and/or a Bluetooth™ subsystem, each including its own radio transceiver and protocol(s) as will be understood by those skilled in the arts based on the discussion provided herein. In some implementations, the one or more transceivers 220 may include more or fewer systems for communicating with other devices.

In some examples, the one or more the transceivers 220 may include one or more circuits (including a WLAN transceiver) to enable connection(s) and communication over WLAN networks such as, but not limited to, networks based on standards described in IEEE 802.11.

Additionally, or alternatively, the one or more the transceivers 220 may include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, the transceiver 220 may include a Bluetooth™ transceiver. Additionally, the one or more the transceivers 220 may include one or more circuits (including a cellular transceiver) for connecting to and communicating on cellular networks.

As discussed in more detail below with respect to FIGS. 3-7, processor 210 may implement different mechanisms for retrieving, processing, and displaying data as discussed with respect to the system 100 of FIG. 1.

Figure 3:
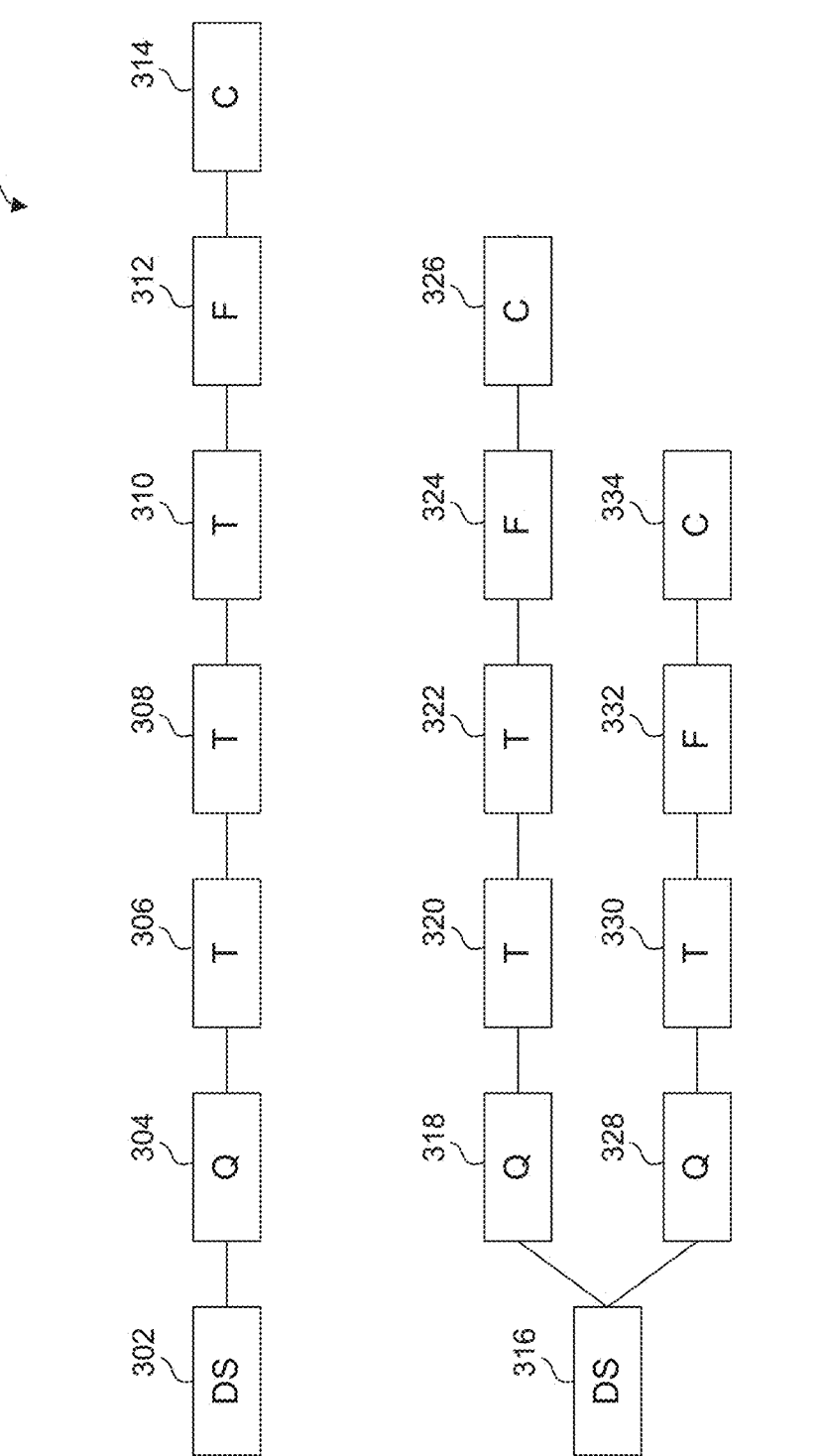
FIG. 3 illustrates an example of data processing steps associated with the database management system, according to some embodiments of the disclosure.

FIG. 3 illustrates an example 300 of data processing steps associated with a database management system, according to some embodiments of the disclosure. As a convenience and not a limitation, FIG. 3 may be described with regard to elements of FIGS. 1, 2, and 7. The example 300 may represent the operation of devices (e.g., the user device 102, the database management system 104, the database 106, the user interference 108, or a combination thereof of FIG. 1) implementing data processing steps associated with a database management system. The example 300 may also be performed by computer system 700 of FIG. 7. But the example 300 is not limited to the specific embodiments depicted in those figures and other systems may be used to perform the method, as will be understood by those skilled in the art. It is to be appreciated that not all operations may be needed, and the operations may not be performed in the same order as shown in FIG. 3.

In some embodiments, the example 300 represents a data flow, such as an IDF, which includes one or more data management processes. For example, the example 300 includes a first data management process that includes a data source 302, a query 304, transforms 306, 308, and 310, a final exposition 312, and a consumer structure 314. In some embodiments, the data source 302 may be a data source in the database 106 of FIG. 1. The database management system 104 may receive a request from the user device 102 that indicates the data source 302. The database management system 104 can then generate the query 304 based on the request to retrieve data from the data source 302. In addition, the request may also indicate required transforms. The database management system 104 may generate the transforms 306, 308, and 310 based on the required transforms indicated by the request. For example, the transforms 306, 308, and 310 may include filters that remove a portion of data from data retrieved from the data source 302 based on the query 304. The transforms 306, 308, and 310 may also include other data manipulation processes, such as data aggregation, data sorting, data merging, data cleaning, and so on. In some embodiments, the final exposition 312 can select candidate data from the data retrieved by the query 304 and transformed by the transforms 306, 308, and 310. The consumer structure 314 may consume the selected candidate data. For example, the consumer structure 314 can generate analytics visualizations, such as tables and charts, to show usages of the selected candidate data. Specifically, the user or the database management system 104 may export a first portion of the selected candidate data. The analytics visualizations can mark the first portion of the selected candidate data as used. The selected candidate data may also include a second portion of the selected candidate data that are not used or exported by the user or the database management system 104. Thus, the analytics visualizations can mark the second portion of the selected candidate data as unused. In addition, the consumer structure 314 can also perform transform functions, such as sorting, filtering, calculations based on analytics objects. For example, the analytics objects may require a city to be New York City. In such a case, the consumer structure 314 can check and remove data from the selected candidate data that correspond to cities other than New York City.

In some embodiments, the user can observe the analytics visualizations and adjust the first data management process based on the first and the second portions of the selected candidate data. For example, the user may determine that the query 304 includes a first part corresponding to the first portion of the selected candidate data and a second part corresponding to the second portion of the selected candidate data. The user can reconfigure the request so that the second part is removed from the query 304. This is because the second portion of the selected candidate data is not used anyway so the second part is not needed.

In some embodiments, the example 300 also includes a second and third data management processes. In some embodiments, the second data management process can include a data source 316, a query 318, transforms 320 and 322, a final exposition 324, and a consumer structure 326. Similarly, the third data management process can include the data source 316, a query 328, a transform 330, a final exposition 332, and a consumer structure 334. In some embodiments, the database management system 104 can configure the second data management process based on a second request received from the user device 102. The second request can indicate the data source 316, the query 318, the transforms 320 and 322, the final exposition 324, and the consumer structure 326. Similarly, the database management system 104 can configure the third data management process based on a third request received from the user device 102. In other embodiments, the database management system 104 may receive a request that indicates the first, the second, and the third data management processes.

In some embodiments, connections between steps may have different line weights or widths based on data transmitted in the connections. For example, the line weights and the widths of the connections can correspond to metadata between steps, such as an amount of data retrieved (or row counts), a refresh duration, a data fetch duration, and so on. Here, a first connection between the transform 322 and the final exposition 324 may represent an amount of data processed by the transform 322 and transmitted to the final exposition 324. A second connection between the final exposition 324 and the consumer structure 326 may represent an amount of data selected by the final exposition 324 and transmitted to the consumer structure 326. The first connection has a larger line weight than the second connection because the final exposition 324 may select a portion of the data received from the transform 322 and transmit the portion of the data to the consumer structure 326. In other words, the amount of data transmitted to the consumer structure 326 may be smaller than that of the data received by the final exposition 324. For another example, a third connection between the transform 330 and the final exposition 332 may correspond to a data fetch duration. Thus, the line weight or width of the third connection represents an amount of time used to fetch data from the transform 330 to the final exposition 332. In this way, the example 300 provides a readable illustration to the user to understand data that go through different steps of the data management processes. In some embodiments, the database management system 104 can also display connections in different colors based on the metadata between steps. For example, when an amount of data transmitted between two steps is large, a connection between the two steps can be displayed as red. When the amount of data transmitted between the two steps is small, the connection between the two steps can be displayed as blue.

Figure 4:
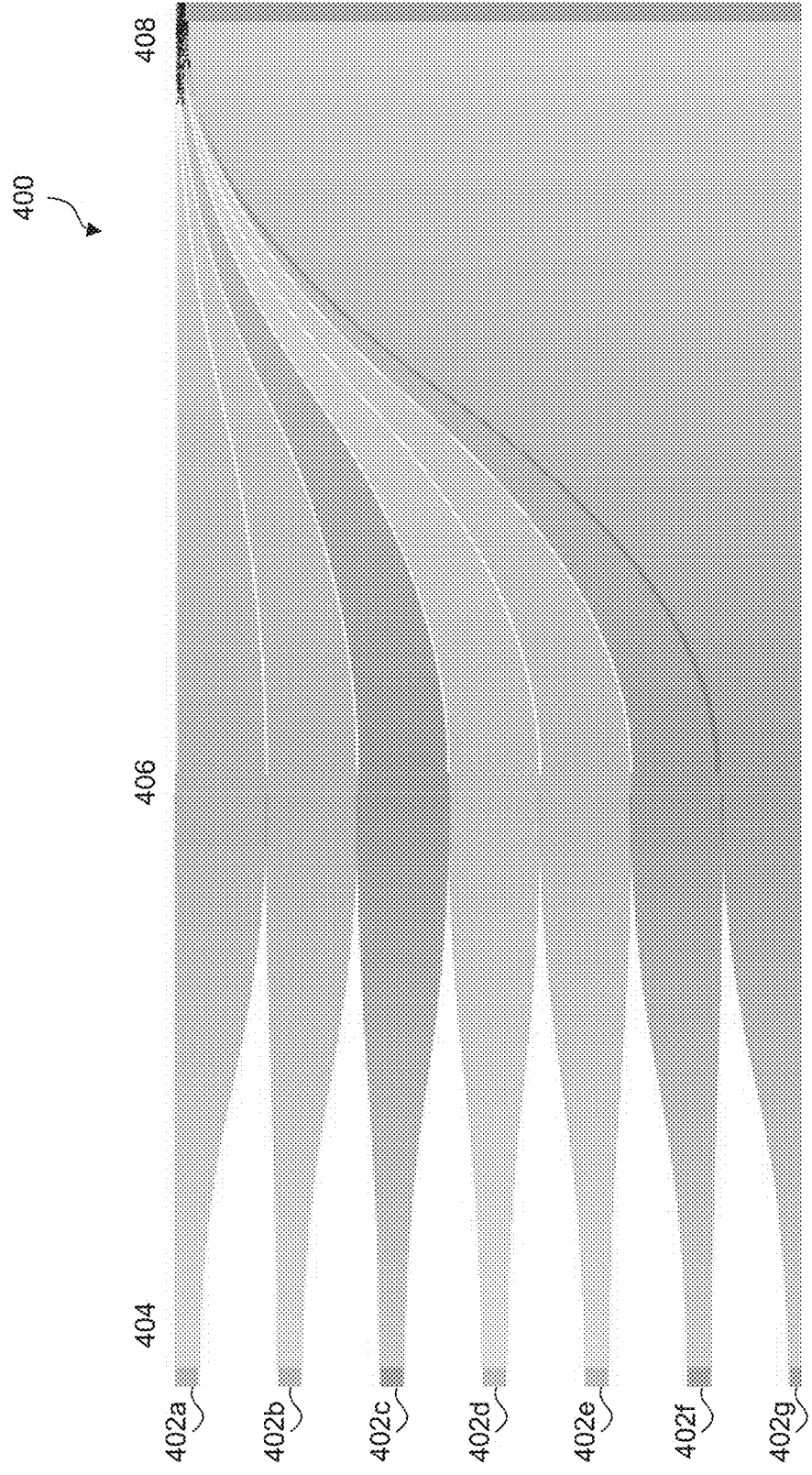
FIG. 4 illustrates an example of an IDF with weight indications, according to some embodiments of the disclosure.

FIG. 4 illustrates an example 400 of an IDF with weight indications, according to some embodiments of the disclosure. As a convenience and not a limitation, FIG. 4 may be described with regard to elements of FIGS. 1, 2, and 7. The example 400 may represent the operation of devices (e.g., the user device 102, the database management system 104, the database 106, the user interference 108, or a combination thereof of FIG. 1) implementing the IDF with weight indications. The example 400 may also be performed by computer system 700 of FIG. 7. But the example 400 is not limited to the specific embodiments depicted in those figures and other systems may be used to perform the method, as will be understood by those skilled in the art. It is to be appreciated that not all operations may be needed, and the operations may not be performed in the same order as shown in FIG. 4

In some embodiment, the example 400 includes an IDF that includes data management processes 402a, 402b, 402c, 402d, 402e, 402f, and 402g. Each of the data management processes may include steps 404, 406, and 408. In some embodiment, the step 404 can be data sources. For example, the data management process 402a may include a first data source, the data management process 402b may include a second data source; the data management process 402c may include a third data source; the data management process 402d may include a fourth data source; the data management process 402e may include a fifth data source; the data management process 402f may include a sixth data source; and the data management process 402g may include a seventh data source. The data sources can be indicated by a request. For example, the database management system 104 can receive a request from the user device 102. The request may include a set of information for each of the data management processes 402a, 402b, 402c, 402d, 402e, 402f, and 402g that indicates each of the data sources.

In some embodiment, the step 406 in the middle can include data queries. For example, the data management process 402a may include a first data query; the data management process 402b may include a second data query; and so on and so forth. Similar to the data sources, the data queries can be indicated by the request. In some embodiments, each of the data queries is displayed in the IDF with a line width corresponding to a data query quality. The data query quality may include a number of columns in a query, a data fetch duration, and an amount of data retrieved. Here, the step 406 displays with the number of columns in the queries. Because the data queries of the data management processes 402a, 402b, 402c, 402d. 402e, 402f, and 402g have a same number of columns, they are displayed with a same line width. In some embodiments, the step 408 on the right may also display the data queries. Instead of displaying the data queries with numbers of columns in the data queries, the step 408 displays with other types of the data query quality, such as the data fetch duration or the amount of data retrieved. Here, the step 408 displays with the amount of data retrieved. Thus, the data query of the data management process 402g retrieves more data compared with the data queries of other data management processes. In this way, a user observing the IDF can understand the data queries and data retrieved from the data queries conveniently.

Figure 5:
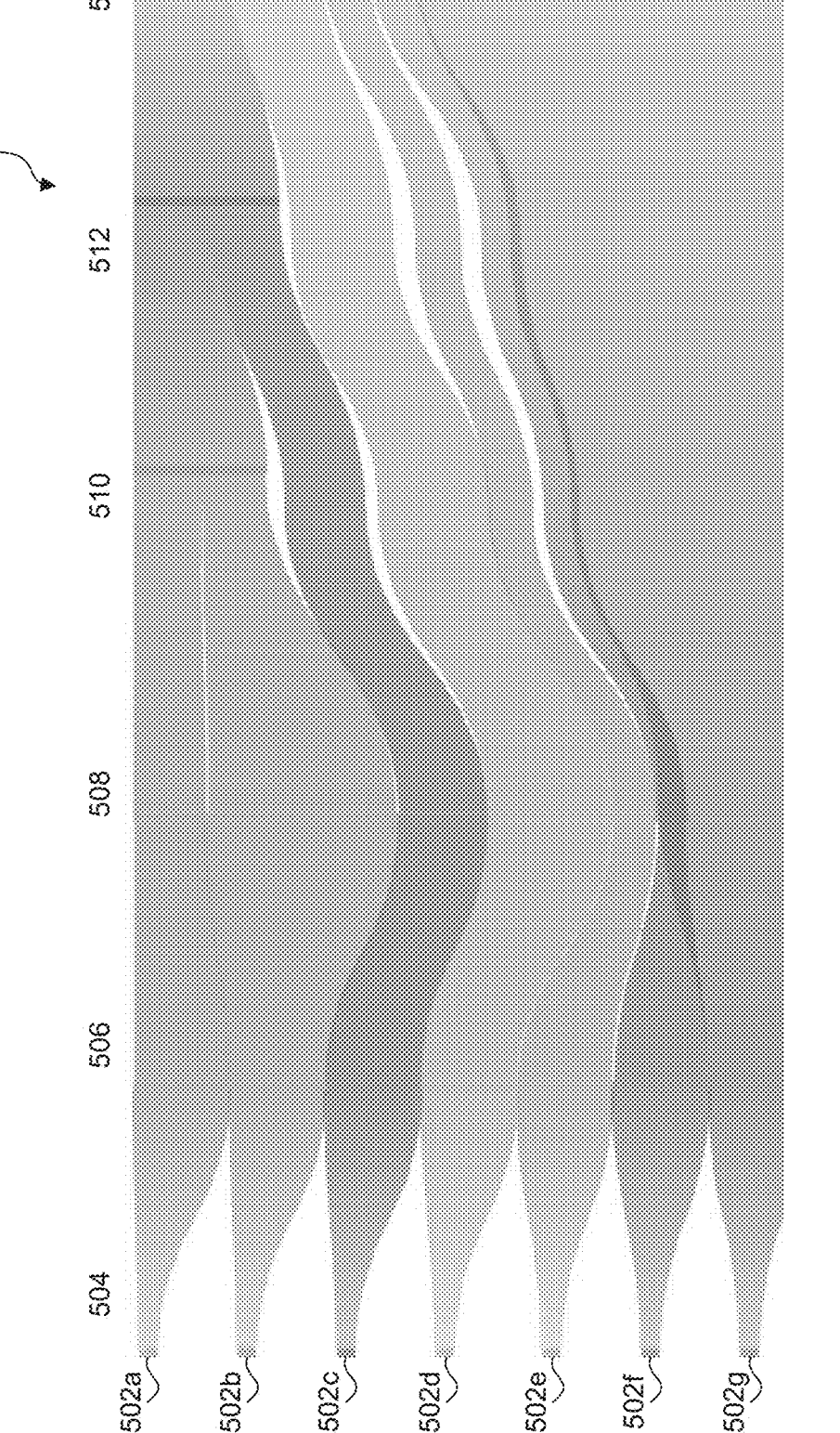
FIG. 5 illustrates an example of an IDF with merge operations, according to embodiments of the disclosure.

FIG. 5 illustrates an example 500 of an IDF with merge operations, according to some embodiments of the disclosure. As a convenience and not a limitation, FIG. 5 may be described with regard to elements of FIGS. 1, 2, and 7. The example 500 may represent the operation of devices (e.g., the user device 102, the database management system 104, the database 106, the user interference 108, or a combination thereof of FIG. 1) implementing the IDF with merge operations. The example 500 may also be performed by computer system 700 of FIG. 7. But the example 500 is not limited to the specific embodiments depicted in those figures and other systems may be used to perform the method, as will be understood by those skilled in the art. It is to be appreciated that not all operations may be needed, and the operations may not be performed in the same order as shown in FIG. 5.

In some embodiments, the example 500 includes an IDF that includes data management processes 502a, 502b, 502c, 502d, 502e, 502f, and 502g. Each of the data management processes may include steps 504, 506, 508, 510, 512, and 514. In some embodiment, the step 504 can include data sources. Similar to FIG. 4, each of the data management processes includes their respective data sources, which can be indicated in a request received by the database management system 104 from the user device 102. In some embodiments, the steps 506 and 508 may display data queries based on a data query quality, such as a number of columns in a query, a data fetch duration, and an amount of data retrieved. Here, the step 506 may display the data queries in the data management processes based on numbers of columns in data queries. Because the numbers of columns of the data queries in the data management processes 502a, 502b, 502c, 502d, 502e, 502f, and 502g are similar, line widths of the step 506 for each of the data management process are similar. In some embodiments, the step 508 also displays the data queries, but with a different data query quality, such as an amount of data retrieved. Here, the data management process 502b has a wider line in the step 508 compared with other data management processes. Thus, the data query of the data management process 502b retrieves more data than the data queries of other data management processes in FIG. 5.

In some embodiments, the steps 510, 512, and 514 may be transforms, such as data merging. For example, at the step 510, the database management system 104 may merge data of the data management processes 502a and 502b. In some embodiments, the data queries of the data management processes 502a and 502b may include a common object and thus the data of the data management processes 502a and 502b can be merged based on the common object. Similarly, in the step 512, the database management system 104 may further merge data of the data management process 502c. In other words, the database management system 104 may merge data of the data management processes 502a, 502b, and 502c in the step 512. In the step 514, the database management system 104 may also merge data of the data management processes 502a, 502b, 502c, and 502d. In addition, the database management system 104 may also merge data in the data management processes 502f and 502g.

In some embodiments, the IDF may show merged lines based on combined data after merging. For example, in the step 510, the merged data may include the data retrieved in the data management processes 502a and 502b. As previously discussed, the step 508 display the data queries based on the amount of data retrieved. However, the step 510 may display the merged data based on a different data quality, such as a data fetch duration, a number of rows, or others characteristics of the combined data. Similarly, the steps 512 and 514 may display merged data based on various data qualities.

In some embodiments, the database management system 104 may recommend adjustments or reconfigurations to a user in the IDF. For example, the data management process 502g may share one or more objects with the data management process 502f. In such a case, the database management system 104 may recommend the user merging data in the data management processes 502f and 502g. The recommendation can be a pop-up window overplayed in the IDF or a message that the database management system 104 transmits to the user device 102. For another example, the step 514 may display data based on a data fetch duration. Thus, data of the data management process 502g, as shown here, require more time to fetch than any other data management processes in FIG. 5. Accordingly, the data management process 502g may slow down the entire IDF. In such a case, the database management system 104 may recommend reconfiguring or removing the data management process 502g. In some embodiments, the data query of the data management process 502g may be inefficient or redundant. Reconfiguring the data query may reduce the data fetch duration of the data management process 502g. For yet another example, the step 514 may display data based on an amount of data retrieved. Thus, the data management process 502g may retrieve more data than any other data management processes in the IDF. However, the database management system 104 may determine that only a small portion of the data retrieved in the data management process 502g is finally consumed or exported to the user. For example, the small portion maybe 10% of the data retrieved in the data management process 502g. In such a case, the database management system 104 may recommend adding a filter in the data management process 502g so that unused data can be removed. Alternatively, the database management system 104 may also recommend removing the data management process 502g because of the inefficiency.

In some embodiments, the user may adjust or reconfigure the IDF. For example, the user may break the data management processes 502a and 502b in the step 510 so that the data do not merge in the step 510. For another example, the user may configure to merge data of the data management processes 502f and 502g in the step 510. For yet another example, the user may remove a data management process, such as the data management processes 502g, from the IDF. In some embodiments, the user may adjust or reconfigure the IDF based on recommendations provided by the database management system 104 or other sources.

Figure 6:
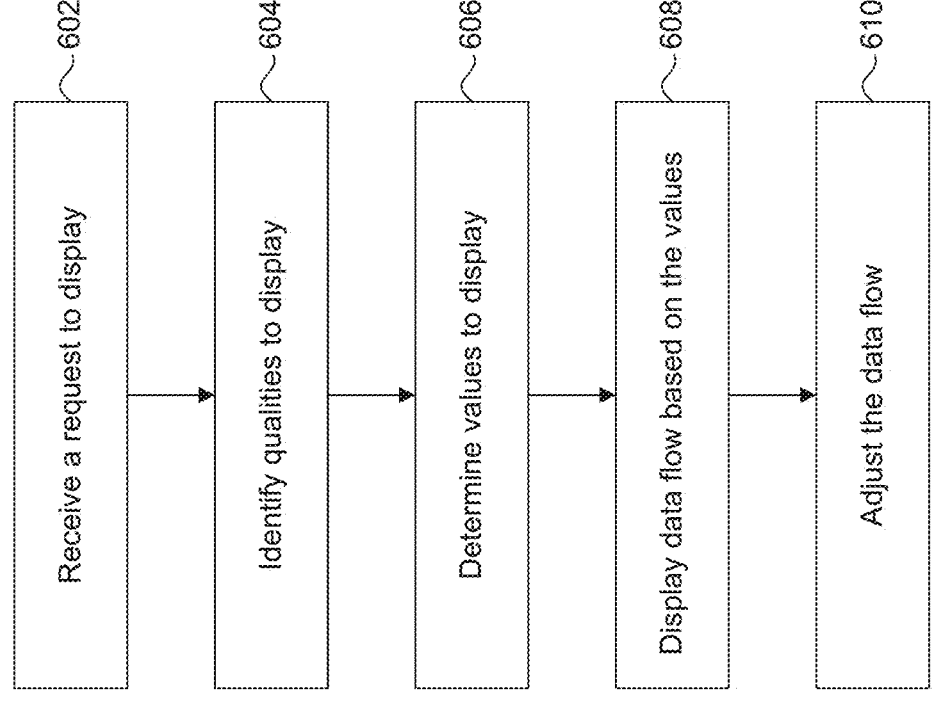
FIG. 6 illustrates an example method of data management process with an IDF, according to embodiments of the disclosure.

FIG. 6 illustrates an example method 600 of a data management processes with an IDF, according to some embodiments of the disclosure. As a convenience and not a limitation, FIG. 6 may be described with regard to elements of FIGS. 1, 2, and 7. The example method 600 may represent the operation of devices (e.g., the user device 102, the database management system 104, the database 106, the user interference 108, or a combination thereof of FIG. 1) implementing data management process with an IDF. The example method 600 may also be performed by computer system 700 of FIG. 7. But the example method 600 is not limited to the specific embodiments depicted in those figures and other systems may be used to perform the method, as will be understood by those skilled in the art. It is to be appreciated that not all operations may be needed, and the operations may not be performed in the same order as shown in FIG. 6.

At 602, a database management system, such as the database management system 104, receives a request to display data. The request may indicate one or more data management processes. For example, the request may indicate the first, the second, and the third data management processes in FIG. 3. The request may also indicate the data management processes 402a, 402b, 402c, 402d, 402e, 402f, and 402g or the data management processes 502a, 502b, 502c, 502d, 502e, 502f, and 502g. In some embodiments, a data management process may include a data source, a data query, and one or more data transforms. The data management process may also include a final exposition and a consumer.

At 604, the database management system 104 identifies data qualities to display. As discussed above, a data management process may include one or more steps. For example, the data management process 502a includes steps 504, 506, 508, 510, 512, and 514. The database management system 104 can display each step in the IDF based on various data quality. As shown in FIG. 5, the database management system 104 may display the step 506 based on a number of columns in the data query of the data management process 502a. The database management system 104 may also display the step 508 based on a data fetch duration of the data query of the data management process 502a. In some embodiments, the database management system 104 identifies the data qualities to display based on the request. In other embodiments, the database management system 104 identifies the data qualities to display based on user input or user instructions.

At 606, the database management system 104 determines a value to display. For example, in the step 506, the database management system 104 may determine that the data query of the data management process 502a includes five columns. In such a case, the value of the data management process 502a in the step 506 is five. The database management system 104 may also determine that the data queries of other data management processes in FIG. 5 also include five columns. Thus, the values of other data management processes in FIG. 5 in the step 506 are also five.

At 608, the database management system 104 displays the data management processes in an IDF based on the values. For example, as discussed above, the values of the data management processes of FIG. 5 in the step 506 is five. In such a case, the database management system 104 displays the step 506 of the data management processes using lines with a line width corresponding to the value five. In some embodiments, a higher value corresponds to a wider line and a lower value corresponds to a thinner line. For another example, the value of the data management processes of FIG. 5 in the step 510 may be different from the values in step 506. Thus, the database management system 104 may display the step 510 differently from the step 506. For example, the data management process 502c may include a first portion corresponding to the step 506 and a second portion corresponding to the step 510. Because the values of the steps 506 and 510 for the data management process 502c are different, line widths of the first portion and the second portion of the data management process 502c are different. In some embodiments, the first portion and the second portion of the data management process 502c may have different colors based on the first value and the second value.

In some embodiments, the database management system 104 may also display merged data based on values. For example, the database management system 104 may determine a first value of the data management process 502a in the step 510 and a second value of the data management process 502b in the step 510. As discussed above, the database management system 104 may display the data management processes 502a and 502b in the step 510 based on the first value and the second value. For example, a line width of the data management process 502a in the step 510 may correspond to the first value and a line width of the data management process 502b in the step 510 may correspond to the second value. In some embodiments, the database management system 104 may display the data management processes 502a and 502b with a combined line in the step 510 since they merge in the step 510. The database management system 104 may determine a combined value based on the first value and the second value. For example, the first value and the second value may be amounts of data in the data management processes 502a and 502b. The combined value may be a sum of the first value and the second value. In some embodiments, the data in the data management processes 502a and 502b may overlap. In such a case, the combined value may be smaller than the sum of the first and the second values because the overlapping data are only counted once. In either case, the database management system 104 may generate a combined line with a line width corresponding to the combined value and replace portions of the data management processes 502a and 502b in the step 510 with the combined line.

In some embodiments, a data management process may further include a final exposition step and a consumer step. Similar to the discussion above, the database management system 104 can determine a third value and a fourth value for the data management process. The database management system 104 can display a third portion of the data management process corresponding to the final exposition step based on the third value and display a fourth portion of the data management process corresponding to the consumer step based on the fourth value. For example, the third portion and the fourth portion may have different widths or colors depending on the third and the fourth value.

At 610, the database management system 104 can adjust the IDF. As discussed above, the database management system 104 can break two merged data management processes or merge two separate data management processes. The database management system 104 can also remove or add data management processes in the IDF. In some embodiments, the database management system 104 may adjust the IDF based on input from a user.

Figure 7:
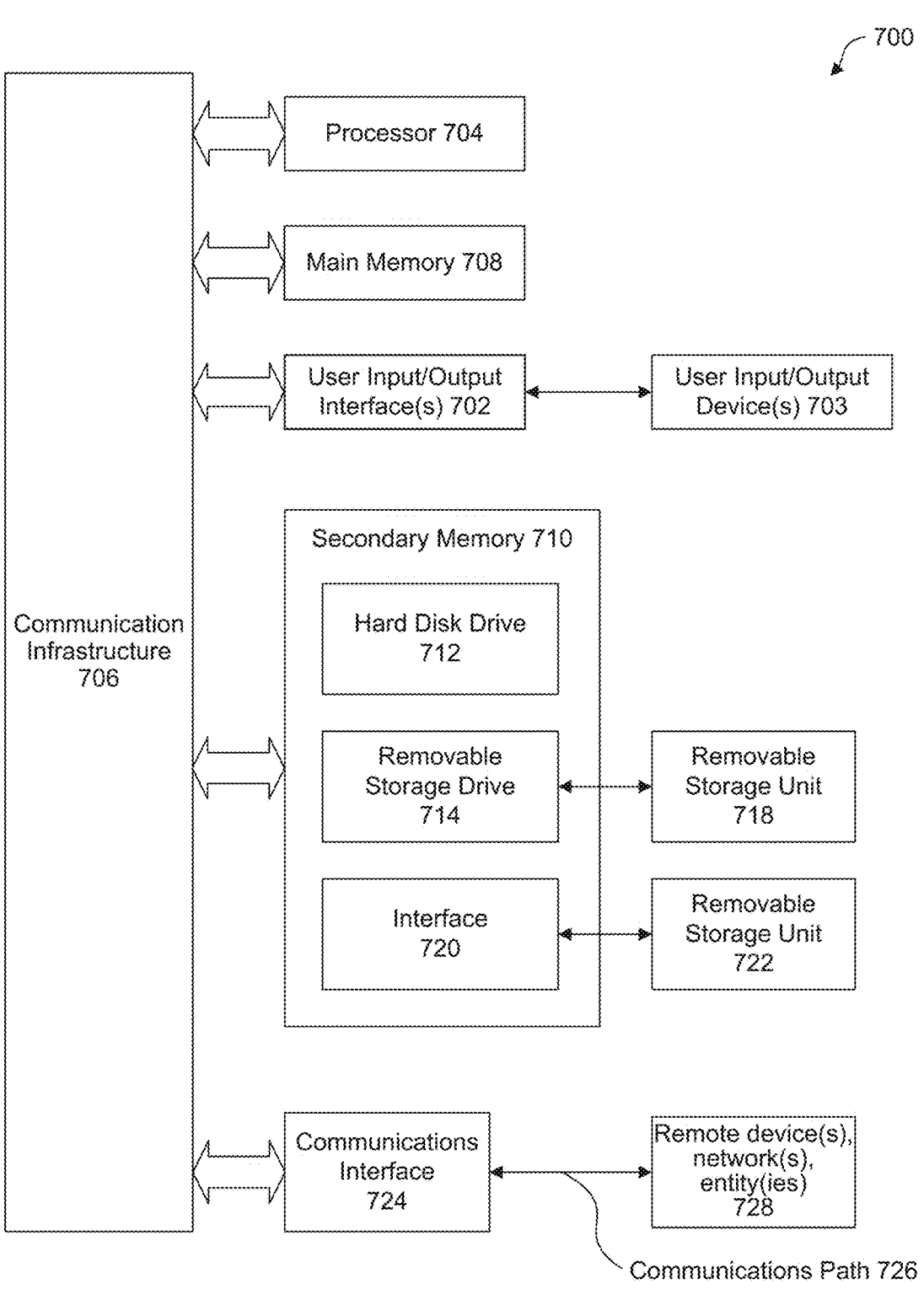
FIG. 7 is an example computer system for implementing some embodiments of the disclosure or portion(s) thereof.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A database management system, comprising:
a user interface;
a memory; and
at least one processor coupled to the memory and configured to:
  receive a request to display a first data management process, wherein the first data management process comprises a first data source, a first data query, and a first data transform;
  display, using the user interface, the first data management process, wherein the first data query corresponds to a first portion of the first data management process and the first data transform corresponds to a second portion of the first data management process;
  identify a data query quality and a data transform quality for display, wherein the data query quality includes a number of columns in the first data query or a data fetch duration of the first data query, and wherein the data transform quality includes a number of columns in the first data transform and a data fetching duration of the first data transform;
  determine a first value of the data query quality for the first data query and a second value of the data transform quality for the first data transform; and
  adjust, using the user interface, the display of the first data management process based on the first value and the second value by adjusting a width of the first portion of the first data management process and a width of the second portion of the first data management process, wherein the width of the first portion of the first data management process is associated with the first value and the width of the second portion of the first data management process is associated with the second value.

2. The database management system of claim 1, wherein the first data management process further comprises a first final exposition and a first consumer.

3. The database management system of claim 2, wherein the at least one processor is further configured:
  determine a third value of the first final exposition and a fourth value of the first consumer,
  wherein the first final exposition corresponds to a third portion of the first data management process and the first consumer corresponds to a fourth portion of the first data management process, and
  wherein a width of the third portion of the first data management process is associated with the third value and a width of the fourth portion of the first data management process is associated with the fourth value.

4. The database management system of claim 1, wherein the at least one processor is further configured to:
  determine a first color that is associated with the first value of the data query quality;
  determine a second color that is associated with the second value of the data transform quality;
  display the first portion of the first data management process using the first color; and
  display the second portion of the first data management process using the second color.

5. The database management system of claim 1, wherein the request further indicates a second data management process that comprises a second data query, the at least one processor is further configured to:
  determine that the first data query and the second data query have a common object; and
  merge the first data query and the second data query.

6. The database management system of claim 5, wherein to merge the first data query and the second data query, the at least one processor is further configured to:
  determine a fifth value of the data query quality for the second data query;
  determine a first portion of the second data management process that is associated with the second data query;
  determine a combined value based on the first value and the fifth value; and
  replace the first portion of the first data management process and the first portion of the second data management process with a combined data management process portion that has a width corresponding to the combined value.

7. The database management system of claim 1,
  wherein the data query quality comprises a first data fetch duration or a first amount of data retrieved, and
  wherein the data transform quality comprises a second data fetch duration or a second amount of data retrieved.

8. A computer-implemented method for a database management system, comprising:
  receiving a request to display a first data management process, wherein the first data management process comprises a first data source, a first data query, and a first data transform;
  displaying, using a user interface of the database management system, the first data management process, wherein the first data query corresponds to a first portion of the first data management process and the first data transform corresponds to a second portion of the first data management process;

identifying a data query quality and a data transform quality for display, wherein the data query quality includes a number of columns in the first data query or a data fetch duration of the first data query, and wherein the data transform quality includes a number of columns in the first data transform and a data fetching duration of the first data transform;

determining a first value of the data query quality for the first data query and a second value of the data transform quality for the first data transform; and adjusting, using the user interface, the display of the first data management process based on the first value and the second value by adjusting a width of the first portion of the first data management process and a width of the second portion of the first data management process, wherein the width of the first portion of the first data management process is associated with the first value and the width of the second portion of the first data management process is associated with the second value.

9. The computer-implemented method of claim 8, wherein the first data management process further comprises a first final exposition and a first consumer.

10. The computer-implemented method of claim 9, further comprising:

determining a third value of the first final exposition and a fourth value of the first consumer, wherein the first final exposition corresponds to a third portion of the first data management process and the first consumer corresponds to a fourth portion of the first data management process, and wherein a width of the third portion of the first data management process is associated with the third value and a width of the fourth portion of the first data management process is associated with the fourth value.

11. The computer-implemented method of claim 8, further comprising:

determining a first color that is associated with the first value of the data query quality;

determining a second color that is associated with the second value of the data transform quality;

displaying the first portion of the first data management process using the first color; and displaying the second portion of the first data management process using the second color.

12. The computer-implemented method of claim 8, wherein the request further indicates a second data management process that comprises a second data query, the computer-implemented method further comprising:

determining that the first data query and the second data query have a common object; and merging the first data query and the second data query.

13. The computer-implemented method of claim 12, wherein the merging the first data query and the second data query further comprises:

determining a fifth value of the data query quality for the second data query;

determining a first portion of the second data management process that is associated with the second data query;

determining a combined value based on the first value and the fifth value; and replacing the first portion of the first data management process and the first portion of the second data management process with a combined data management process portion that has a width corresponding to the combined value.

14. The computer-implemented method of claim 9, wherein the data query quality comprises a first data fetch duration or a first amount of data retrieved, and wherein the data transform quality comprises a second data fetch duration or a second amount of data retrieved.

15. A non-transitory computer-readable device having instructions stored thereon that, when executed by at least one computing device, cause the at least one computing device to perform operations, the operations comprising:

receiving a request to display a first data management process, wherein the first data management process comprises a first data source, a first data query, and a first data transform;

displaying, using a user interface of the at least one computing device, the first data management process, wherein the first data query corresponds to a first portion of the first data management process and the first data transform corresponds to a second portion of the first data management process;

identifying a data query quality and a data transform quality for display, wherein the data query quality includes a number of columns in the first data query or a data fetch duration of the first data query, and wherein the data transform quality includes a number of columns in the first data transform and a data fetching duration of the first data transform;

determining a first value of the data query quality for the first data query and a second value of the data transform quality for the first data transform; and adjusting, using the user interface, the display of displaying the first data management process based on the first value and the second value by adjusting a width of the first portion of the first data management process and a width of the second portion of the first data management process, wherein the width of the first portion of the first data management process is associated with the first value and the width of the second portion of the first data management process is associated with the second value.

16. The non-transitory computer-readable device of claim 15, wherein the first data management process further comprises a first final exposition and a first consumer.

17. The non-transitory computer-readable device of claim 16, wherein the operations further comprise:

determining a third value of the first final exposition and a fourth value of the first consumer, wherein the first final exposition corresponds to a third portion of the first data management process and the first consumer corresponds to a fourth portion of the first data management process, and wherein a width of the third portion of the first data management process is associated with the third value and a width of the fourth portion of the first data management process is associated with the fourth value.

18. The non-transitory computer-readable device of claim 17, wherein the operations further comprise:

determining a first color that is associated with the first value of the data query quality;

determining a second color that is associated with the second value of the data transform quality;

displaying the first portion of the first data management process using the first color; and displaying the second portion of the first data management process using the second color.

19. The non-transitory computer-readable device of claim 15, wherein the request further indicates a second data management process that comprises a second data query, and wherein the operations further comprise:

determining that the first data query and the second data query have a common object; and merging the first data query and the second data query.

20. The non-transitory computer-readable device of claim 19, wherein the merging the first data query and the second data query further comprises:

determining a fifth value of the data query quality for the second data query;

determining a first portion of the second data management process that is associated with the second data query;

determining a combined value based on the first value and the fifth value; and replacing the first portion of the first data management process and the first portion of the second data management process with a combined data management process portion that has a width corresponding to the combined value.

\* \* \* \* \*